United States Patent Office 3,676,157
Patented July 11, 1972

3,676,157
METHOD OF PREPARING FREEZE-THAW STABLE SPOONABLE SALAD DRESSING
Peter Wintersdorff, San Diego, Calif., assignor to Kelco Company, San Diego, Calif.
No Drawing. Filed July 16, 1970, Ser. No. 55,619
Int. Cl. A23l 1/24
U.S. Cl. 99—144                  4 Claims

ABSTRACT OF THE DISCLOSURE

A method of making a spoonable salad dressing containing starch, about 30 to about 70 percent of an edible oil, about 30 to about 70 percent of water, about 1 to about 3.5 percent of salt, and a Xanthomonas colloid in about 0.2 to about 0.3 percent by weight, said method comprising admixing the ingredients for the dressing including up to about 0.75 percent by weight of salt, emulsifying the mixture, and thereafter blending the balance of the salt into the emulsion.

---

This invention relates to an improved spoonable salad dressing, i.e., a dressing having a non-flowing, pasty consistency in the viscosity range of about 30,000 to about 80,000 cps., as measured at about 70° F. using a Model HAT Brookfield Viscometer at 5 r.p.m., mounted on a Brookfield Heliopath Stand, Model C. More specifically, the invention pertains to an improved spoonable salad dressing which is more thermally stable and which contains a small effective quantity of a Xanthomonas hydrophilic colloid.

In general, the spoonable salad dressings which are presently obtainable cannot be subjected to freezing temperatures. Freezing temperatures cause drastic changes in the physical properties of such dressings which may occur during of after thawing of the dressings. As an example, it was found in the case of one dressing that freezing caused almost total oil separation from the dressing after thawing.

An object of the present invention is to provide an improved spoonable salad dressing which has greater freeze-thaw stability. A further object is to provide a method of preparing a spoonable salad dressing having improved freeze-thaw stabiilty. Additional objects will become apparent from a reading of the specification and claims which follow.

The contents of a salad dressing are controlled by the Food Drug Administration. As defined in their regulations, salad dressing is the emulsified semisolid food prepared from edible vegetable oil, one or both of the acidifying ingredients specified in the regulations, one or more of the egg-yolk-containing ingredients specified in the regulations, and a cooked or partly cooked starchy paste prepared with a food starch, tapioca flour, wheat flour, rye flour or any two or more of these. In the preparation of such a starchy paste, water may be added.

In addition, a salad dressing may be seasoned or flavored with various ingredients, as specified in the regulations. Among these are salt, monosodium, glutamate, and any suitable, harmless food seasoning or flavoring (other than imitations), provided that it does not impart to the salad dressing a color simulating the color imparted by egg yolk. Various sweetening ingredients may be added to the salad dressing, and these include sugar, dextrose, corn syrup, invert sugar syrup, nondiastatic maltose syrup, glucose syrup, and honey. The various sweetening ingredients may be used in either syrup or in dried form. Other flavoring ingredients which may be added include mustard, paprika, other spice, or any spice oil or spice extract except that no tumeric or saffron may be used. Moreover, no spice oil or spice extract may be used which imparts to the salad dressing a color simulating the color imparted by egg yolk.

The acidifying ingredients which may be present in a salad dressing include any vinegar or any vinegar diluted with water, or any such vinegar or diluted vinegar mixed with citric acid as an additional optional acidifying ingredient. However, in any such mixture, the weight of citric acid must not be greater than 25% of the weight of the acids of the vinegar or diluted vinegar calculated as acetic acid. Any blend of two or more vinegars is considered by the regulations to be a vinegar. Futrher acidifying ingredients which may be used include lemon juice, or lime juice, or both, or any such juice in frozen, canned, concentrated, or dried form, or any one or more of these diluted with water.

The egg-yolk containing ingredients which may be present in the salad dressing are liquid egg yolks, frozen egg yolks, dried egg yolks, liquid whole eggs, frozen whole eggs, or any one or more of the foregoing with liquid egg white or frozen egg white. The regulations specify that salad dressing must contain a quantity of egg-yolk-containing ingredient that is not less than an equivalent egg-yolk solids content provided by 4% by weight of liquid egg yolks. Also, the regulations require that salad dressings must contain not less than 30% by weight of vegetable oil.

Various optional emulsifying ingredients may also be present in a salad dressing in accord with the standards. These emulsifying ingredients include various gums, sodium carboxymethyl cellulose, propylene glycol ester of alginic acid, etc. As specified by the regulations, the quantity of any such emulsifying ingredient should not constitute more than 0.75% by weight of the finished salad dressing. Still other optional ingredients, as specified in the regulations, are dioctyl sodium sulfosuccinate, calcium disodium ethylenediaminetetraacetate or disodium ethylenediaminetetraacetate. The permissible concentrations of these optional ingredients in the finished food product are specified in the regulations.

Inasmuch as the standards for a salad dressing may vary from time to time, it should be understood that the subject matter of the present invention is not confined to salad dressings as now defined in the Federal Standards. However, reference is made to the Federal Standards in order to demonstrate that the term "salad dressing" is one which is very precisely used and well understood by the food industry. Thus, in describing the present invention, reference will be made to the term "salad dressing," as that term is employed and understood by the art.

In accord with my invention, a spoonable salad dressing is prepared which contains from about 30 to about 70% by weight of an edible oil and preferably from about 40% to 50% by weight. Suitable edible oils include, for example, vegetable oils such as cotton seed oil, soybean oil, safflower oil, corn oil, olive oil, etc. Water is also present in the salad dressing in an amount ranging from about 30% to about 70% by weight and preferably in the order of about 40% to about 50% by weight. The cooked starch is present in an amount sufficient to give the desired body to the spoonable salad dressing and suitable amounts which have been employed, range up to about 3% by weight of the food product.

An acidifying ingredient is also present in the spoonable salad dressing prepared according to my invention. Suitable acidifying ingredients, as defined in the standards for salad dressing, may include vinegar, lime juice, or lemon juice. The quantity of acidifying ingredients which may be employed in my invention is equivalent to a content of glacial acetic acid in the final food product ranging from about 1 to about 1.5% by weight.

A further ingredient is an emulsifier, e.g., an egg-yolk-containing ingredient of the type defined by the standards, or a synthetic emulsifier such as that identified by the trade name "TWEEN 60" or by the common name polysorbate 60 or the chemical name polyoxyethylene sorbitan monostearate. The quantity of emulsifier which may be present in the salad dressing of my invention may range from about 0.25 to about 4% by weight of the total weight of the food product. A still further ingredient which is present in the spoonable salad dressing of my invention is salt in an amount from about 1% to about 3.5% by weight of the final product.

In addition to the foregoing ingredients, my salad dressing also contains a Xanthomonas hydrophilic colloid in an amount from about 0.2 to about 0.3% by weight. A Xanthomonas hydrophilic colloid that is particularly suitable for use in accord with my invention is a colloid prepared by the bacterium, Xanthomonas campestris.

The Xanthomonas campestris colloid is a polymer containing mannose, glucose, potassium glucuronate and acetyl groups in the approximate molar ratio of 2:1:1:1. In such a colloid, the potassium portion can be replaced by several other cations without substantial change in the properties of the material for my purpose. The colloid is a high molecular weight, exocellular material and may be prepared by the bacterium, Xanthomonas campestris, by whole culture fermentation of a medium containing 2–5 percent commercial glucose, an organic nitrogen source, di-potassium hydrogen phosphate and appropriate trace elements. A suitable incubation times may be approximately 96 hours at 28° C. under aerobic conditions.

In preparing the colloid as aforesaid, it is convenient to use corn steep liquor or distillers' dry solubles as an organic nitrogen source. It may be expedient to grow the culture in two intermediate stages prior to the final inoculation in order to encourage vigorous growth of the bacteria. These stages may be carried out in media having a pH of about 7. In a first stage a transfer from an agar slant to a dilute glucose broth may be made and the bacteria cultured for 24 hours under vigorous agitation and aeration at a temperature of about 30° C. The culture so produced may then be used to inoculate a higher glucose (3%) content broth or larger volume in a second intermediate stage. In this stage the reaction may be permitted to continue for 24 hours under the same conditions as the first stage. The culture so acclimated for growth with glucose by the aforementioned first and second stages may then be added to a final glucose medium.

In the aforesaid method of preparing a Xanthomonas campestris hydrophilic colloid, a loopful of organism from the agar slant is adequate for the first stage comprising 200 milliliters of the said glucose media. In the second stage the material resulting from the first stage may be used together with 9 times its volume of a 3% glucose media. In the final stage the material produced in the second stage may be admixed with 19 times its volume of the final media. A good final media may contain 3% glucose, 0.5% distillers' dry solubles, 0.5% dipotassium phosphate, 0.1% magnesium sulphate having 7 molecules of water of crystallization and water. The reaction in the final stage may be satisfactorily carried out for 96 hours at 30° C. with vigorous agitation and aeration. The resulting Xanthomonas campestris colloidal material which I have found to be suitable for my purpose can be recovered by precipitation in isopropyl alcohol of the mixture from the fermentation.

In preparing a spoonable salad dressing in accord with my invention, I first prepare a blend of the Xanthomonas hydrophilic colloid, sugar and mustard and add to about ½ the total water to be contained in the salad dressing. After the addition, the mixture is stirred vigorously for approximately ½ hour to form a first mixture.

Salt is an amount ranging up to about 0.75 percent by weight of the total content of the salad dressing is dissolved in the remaining portion of water to be present in the salad dressing. The starch to be used in the salad dressing is added to the water containing the salt and the mixture is heated for a sufficient time to cause complete hydration of the starch. Following this, the mixture is permitted to cool and the egg-yolk-containing materials are added with thorough mixing to complete the preparation of the second mixture.

The first and second mixtures are then blended together and thoroughly mixed. To the combined mixture is added a vegetable oil, slowly at first, and then at a more rapid rate with complete addition of the oil taking approximately 2 minutes. During the addition of the oil the mixture is vigorously stirred and the vinegar is added with stirring until the mixture is uniform.

The mixture is then run through a mill, such as a colloid mill, to produce a state of subdivision of the oil globules such that their particle size is greatly reduced. After the material has been milled, the remainder of the salt is then added and is blended in, using, for example, a paddle mixer. My spoonable salad dressing preferably contains salt at a concentration of about 2% by weight. Thus, assuming that the quantity of salt initially added was 0.75% by weight, the remainder of the added salt would be 1.25% by weight in the preferred case.

A typical salad dressing prepared according to my invention contained the following ingredients in the stated weight percentages:

|  | Percent |
|---|---|
| Xanthomonas campestris hydrophilic colloid | 0.3 |
| HPC starch (National Starch Co.) | 2.5 |
| Sugar | 10.0 |
| Salt | 2.0 |
| Mustard (powdered) | 0.5 |
| Egg-yolk (raw) | 4.0 |
| Vegetable oil | 30.0 |
| Vinegar (white) 100 gr. | 10.0 |
| Water | 40.7 |

In preparing thet above salad dressing according to my invention, the Xanthomonas colloid, sugar and mustard were added to ½ the total amount of the water with vigorous stirring. Stirring was continued for one-half hour to form a first mixture. Following this, 35% of the total amount of salt was added to the remaining portion of water along with the starch. This mixture was heated for a sufficient time to cause complete hydration of the starch. Thereafter, the mixture was allowed to cool and the egg yolk was added and thoroughly mixed in to form a second mixture.

The first and second mixtures were then thoroughly mixed and the oil was added, slowly at first, and then at a rapid rate with complete addition taking about two minutes with stirring. Following this, the vinegar was added with stirring until the mixture was uniform. The mixture was then passed through a colloid mill (Manton-Gaulin, Type L.P.) at 0.035 inch. After the mixture had passed through the colloid mill, the remainder of the salt was added and dispersed in the mixture.

Other salad dressings which were prepared using the above-described procedure contained the following ingredients:

| | | |
|---|---|---|
| Xanthomonas campestris hydrophilic colloid | 0.3 | 0.3 |
| HPC starch (National Starch Co.) | 2.5 | 2.5 |
| Sugar | 10.0 | 10.0 |
| Salt | 2.0 | 2.0 |
| Mustard (powdered) | 0.5 | 0.5 |
| Egg-yolk (raw) | 4.0 | 4.0 |
| Vegetable oil | 35.0 | 40.0 |
| Vinegar (white) 100 gr | 10.0 | 10.0 |
| Water | 35.7 | 30.7 |

The above salad dressings, containing the listed ingredients in the amounts shown in percent by weight, were spoonable dressings having the desirable temperature stability which characterizes the dressings of my invention.

The spoonable salad dressings prepared in accord with my invention were subjected to freeze-thaw cycles by first taking an 8-ounce sample of the dressing and placing it in a sealed plastic (screw cap) container. The test sample and container were then placed in a cold room at −20° F. for about 24 to 48 hours. The frozen sample and container were then removed and allowed to thaw at ambient temperature, i.e., about 70° F.

Following this, the screw cap was removed and the test sample was carefully observed for any type of oil or water separation. The sample was observed both at its top and bottom surfaces since the bottom of the plastic container was transparent.

Following this, an aliquot of the sample was spooned out and its texture was observed. Then, the viscosity of the sample was measured at about 70° F. using a Model HAT Brookfield Viscometer at 5 r.p.m. mounted on a Brookfield Heliopath Stand, Model C. The viscosity of the test sample, after undergoing the freeze-thaw cycle, was then compared with the viscosity of the sample prior to undergoing the freeze-thaw cycle.

It was found that there was a slight drop in the viscosity of each of the test samples of salad dressings of my invention after the sample had been subjected to a freeze-thaw cycle. The largest drop in viscosity, e.g., in the order of 10–15 percent of the sample's original viscosity, was observed after the first freeze-thaw cycle. The drop in the viscosity of the test samples became successively smaller after each succeeding freeze-thaw cycle, i.e., less of a viscosity drop after the second freeze-thaw cycle, still less of a drop after the third cycle, etc. After undergoing five successive freeze-thaw cycles, the test samples sustained a total drop in their viscosities of up to about 25 percent of their original viscosities.

All of the test samples of salad dressings of my invention, when tested in the manner described above, experienced no oil separation and still retained excellent texture and spoonability. In contrast, it was found that one of the more widely used commercial salad dressings experienced complete oil separation after undergoing one freeze-thaw cycle under the above test conditions.

I claim:
1. A method of making a spoonable salad dressing which dressing contains an edible oil in about 30% to about 70% by weight of said dressing; water in about 30% to about 70% by weight of said dressing; emulsifier in an amount effective to form an emulsion; cooked starch in an amount sufficient to provide the characteristic body of a spoonable salad dressing; acidifying ingredient, as glacial acetic acid equivalent, in about 1% to about 1.5% by weight of said dressing; Xanthomonas hydrophilic colloid in an amount from about 0.2% to about 0.3% by weight of said dressing; and salt in an amount from about 1.0% to about 3.5% by weight of said dressing, which method comprises: forming a first mixture containing said Xanthomonas hydrophilic colloid and about one-half of said water;
  forming a second mixture comprising the balance of said water together with said cooked starch, said emulsifier, and an amount of said salt ranging up to about 0.75% by weight of said dressing;
  blending said first mixture and said second mixture to form a combined first-second mixture;
  stirring said combined first-second mixture with said edible oil and with said acidifying ingredient until a substantially uniform mixture is obtained;
  emulsifying said uniform mixture; and
  then dispersing the remainder of said salt into said emulsified mixture to obtain a spoonable salad dressing.

2. The method of claim 1 wherein sugar and mustard are also included in said first mixture.

3. The method of claim 1 wherein said emulsifier is an egg-yolk containing ingredient present in an amount from about 0.25 to about 4% by weight of said salad dressing.

4. The method of claim 1 wherein said spoonable salad dressing has a non-flowing, pasty consistency in the viscosity range of about 30,000 to about 80,000 centipoises, as measured at about 70° F. using a Model HAT Brookfield Viscometer at 5 r.p.m. mounted on a Brookfield Heliopath Stand, Model C.

References Cited
UNITED STATES PATENTS 3,067,038   12/1962   O'Connell _____ 99—144

RAYMOND N. JONES, Primary Examiner

J. M. HUNTER, Assistant Examiner